United States Patent [19]
Walters et al.

[11] Patent Number: 5,895,986
[45] Date of Patent: Apr. 20, 1999

[54] PHOTOELECTRIC LOAD CONTROL SYSTEM AND METHOD

[76] Inventors: Jeff D. Walters, 64 Hayes Way, Marshfield, Mass. 02050; Lucinda Seigel, 2404 Divisadero St., San Francisco, Calif. 94115

[21] Appl. No.: 08/846,678

[22] Filed: Apr. 30, 1997

[51] Int. Cl.[6] ............................................. H05B 39/10
[52] U.S. Cl. .................... 307/117; 315/159; 315/360; 250/214 AL; 302/276
[58] Field of Search ............................ 307/117, 139; 315/156, 159, 360; 250/214 AL; 340/540; 302/254, 276

[56] References Cited

U.S. PATENT DOCUMENTS

| | | |
|---|---|---|
| 4,008,415 | 2/1977 | De Avila-Serafin et al. ............ 315/156 |
| 4,236,101 | 11/1980 | Luchaco .................................. 315/156 |
| 4,237,377 | 12/1980 | Sansum ............................. 250/214 AL |
| 4,587,417 | 5/1986 | Duve et al. . |
| 4,731,551 | 3/1988 | Gibbs et al. ............................ 315/159 |

*Primary Examiner*—Albert W. Paladini
*Attorney, Agent, or Firm*—Iandiorio & Teska

[57] ABSTRACT

A photoelectric load control system for applying power to a light or load as a function of ambient light level and as a function of the length of daylight or darkness. The system includes a switching circuit for selectively applying power to the light or load for turning the light or load on and off; an ambient light level sensor for providing a signal which varies between a first state and a second state in response to the ambient light level; and a uniquely programmed processor responsive to this signal for activating the switching circuit. The processor includes a routine for activating the switching means to turn the light or load on in response to one of the states, a timing routine for timing the total darkness period, a counter for counting the period of darkness or daylight, a routine for determining when the count exceeds a predetermined percentage of the total darkness or daylight period, and a routine for activating the switching circuit to turn the light or load off or on after the count equals or exceeds the predetermined percentage of the darkness or daylight period.

25 Claims, 2 Drawing Sheets

PHOTOELECTRIC LOAD CONTROL SYSTEM AND METHOD

FIELD OF INVENTION

This invention relates to a photoelectric load control system and method for applying power to a street light or other load as a function of both the light level and the length of night time for selectively turning the street light or load off or on part way through the night.

BACKGROUND OF INVENTION

Electronic photocontrols are used to automatically turn on lights, such as street lights, parking and sales lot lights, barn lights, flood lights, and billboard lights, when it gets dark, and off when it gets light. See, for example, U.S. Pat. No. 5,195,016 incorporated herein by this reference.

For other lights, such as subway entrance lights, tunnel lights, and for devices such as golf course fountains and the like, the reverse is true: they must automatically turn on in the daytime and turn off at night.

In many cases, however, it is desirable that the lights or devices do not stay on all night or all day. For example, to save energy, every other street light or groups of parking lot lights may be turned off halfway through the night, at approximately midnight, when pedestrian and vehicular traffic is at a minimum.

And, for billboard lights, there is often a desire to turn the lights on when it gets dark, off some time during the night to save energy, and then on again during the rush hour traffic commute if it is still dark (called the "A.M. burn" in the trade) and then off again when it gets light.

A few prior art photocontrols accomplish these tasks either mechanically or electronically through the use of a settable timer. See, for example, the "Light Master" specification by Area Lighting Research, Inc.

The problem with mechanical systems is their inherent unreliability and complexity involving numerous gears and cams. If such a controller fails with the light on, there is a tremendous waste of electricity. In addition, the replacement labor cost as a consequence of a failure greatly exceeds the cost of the controller itself.

The problems with electronic timer based systems which must be set before use are numerous. First, such systems typically include batteries which can fail or degrade in harsh climates. Second, once the timer is set, it does not take into account the longer winter nights and the shorter summer nights especially at extreme latitudes. Adjusting the setting is cost prohibitive. Third, different settings may be required at the factory depending on where the controller will be installed since midnight in California is different than midnight in Massachusetts. This labor intensive setting procedure is also cost prohibitive. Fourth, previous designs and systems were expensive. Finally, power outages and failures can severely affect the factory settings and again, the user incurs excessive adjustment labor costs.

SUMMARY OF INVENTION

It is therefore an object of this invention to provide an improved photoelectric load control system and method for applying power to a light, an auxiliary lighting relay, or some other load as a function of both the light level and the length of the night.

It is further object of this invention to provide such a photoelectric load control system and method which does not have gears or complex mechanical components subject to failure.

It is a further object of this invention to provide such a photoelectric load control system and method which does not require batteries to operate.

It is a further object of this invention to provide such a photoelectric load control system and method which automatically adjusts itself each night and automatically takes into account the longer winter nights and the shorter summer nights.

It is a further object of this invention to provide such a photoelectric load control system and method which accurately turns the light off at a predetermined point during the night at all latitudes, at all locations, and during all seasons.

It is a further object of this invention to provide such a photoelectric load control system and method which does not require factory settings or resettings in the event of a power failure.

It is a further object of this invention to provide such a system that allows field testing or "glove testing" without disrupting the timing function.

This invention results from the realization that instead of using complex mechanical parts or battery based timers which can fail, which require setting or resetting, which do not take into account different time zones and the length of night at different latitudes during different seasons, an improved photocontroller can be made to shut off halfway throughout the night or at some other time during the night through the use of a uniquely programmed microprocessor which times the total period of darkness each night and then, on the next night, turns the light off halfway through the night or at some other percentage of the total period of darkness. Such a controller works properly independent of the time zone or latitude where the controller is used, and continually sets itself each night to account for different length periods of darkness (winter or summer). If a power failure occurs, everything is automatically reset and the controller will again operate correctly the next night after the previous night's total period of darkness is again determined.

In addition, only a slight change is required in the programming to make the controller to turn the light or load on during the day and off during the night or to turn the light on during the "A.M. burn".

Moreover, such a processor based system allows the installer to conduct a "glove test" at the time of installation to test the controller, and also takes into account spurious flashes of light such as lighting or vehicular headlights to correctly determine whether the light should actually be turned off or on.

This invention features a photoelectric load control system for applying power to a light or load as a function of light level and as a function of the length of daylight or darkness. The system comprises switching means for selectively applying power to the light or load for turning the light or load on and off; ambient light sensitive means for providing a signal which varies between a first state and a second state in response to the ambient light level; and processor means, responsive to the signal, for activating the switching means.

The processor includes means for activating the switching means to turn the light on in response to one of the states, means for timing the total daylight or darkness period, means for counting the period of time it is dark or light, means for determining when the count equals or exceeds a predetermined percentage of the total darkness or daylight period, and means, responsive to the means for determining, for activating the switching means to turn the light or load off or on after the count equals or exceeds the predetermined percentage of the total darkness or daylight period. Thus, the light or load is automatically turned on when it gets dark and then off, for example, halfway through the night each night independent of changes in the length of night and without the requirement of special factory or in-situ settings, complex mechanical parts, or batteries or timers.

The means for timing typically includes an initialization routine automatically activated whenever power is first supplied or re-supplied after interruption to the processor means, for resetting the processor, and again counting the total period of daylight or darkness. Thus, if power is lost, the light or load is turned off or on at the appropriate time the next night or day.

The processor means preferably includes a glove test routine including a preset glove test period and means, responsive to the glove test routine, for ignoring "glove test" darkness time count if the duration of darkness is less than a predetermined period of time. Thus, the system facilitates a typical "glove test" without adversely affecting the count representing the length of the darkness period.

The processor means further includes means for setting a spurious light event period and means, responsive to the set spurious light event period, for bypassing the means for activating the switch means to turn the light or load off. Thus, the system takes into account and ignores spurious light events such as lightning.

The first state is typically a low ambient light level and the second state typically is a high ambient light level representing darkness at night and daylight during the day, respectively. Alternatively, the first state is a high ambient light level and the second state is a low ambient light level for devices such as golf course water fountains and tunnel entrance lights which are turned on only in the daylight.

The processor means preferably includes means for activating the switching means to turn the light or load on during the A.M. burn and then off again in response to a change in the ambient light level and thus can be used in conjunction with billboard lighting systems or other places like transit shelters.

The system further includes a test jumper or switch for bypassing the operation of the processor means in a test mode. Once the jumper is cut or removed (or the switch is opened or closed), the processor operates in its normal fashion.

This invention also features a method of operating a photoelectric load control system for applying power to a light or load as a function of ambient light level and as a function of the total length of daylight or darkness. The method comprises selectively applying power to the light or load for turning the light or load on and off; sensing the ambient light level and providing a signal which varies between a first state and a second state in response to the ambient light level; and programming a processor means to be responsive to this signal. The processor is programmed to function as follows: it turns the light or load on or off in response to one of the states, it times the total darkness period, counts the period of time of darkness, determines when the count exceeds a predetermined percentage of the darkness period, and in response, turns the light or load off or on.

Timing typically includes automatically activating an initialization routine whenever power is first supplied or re-supplied to the processor means, for resetting the processor, counting the total period the of time of darkness or daylight, and setting the darkness/daylight period to be equal to the count period. The predetermined percentage is typically 50% but other percentages maybe used. Programming the processor means further includes setting a glove test period and bypassing the step of counting if a period of darkness is not longer than the glove test period. Programming the processor further includes setting a spurious light event period and bypassing the step of turning the light or load off if the spurious light event period is not exceeded.

This invention also features a uniquely programmed processor for a photoelectric load control system for applying power to a light or load as a function of ambient light level and as a function of the length of daylight or darkness. The programming of the processor comprises: means for activating a switching means to turn the light or load on in response to a preset light level; means for timing the total darkness or daylight period; means for counting a period of time of darkness or daylight; and means for determining when the count exceeds a predetermined percentage of the total period. The processor then activates the switching means to turn the light or load off after the count equals or exceeds the predetermined percentage of the total period.

DISCLOSURE OF PREFERRED EMBODIMENT

Other objects, features and advantages will occur to those skilled in the art from the following description of a preferred embodiment and the accompanying drawings, in which.

Figure 1:
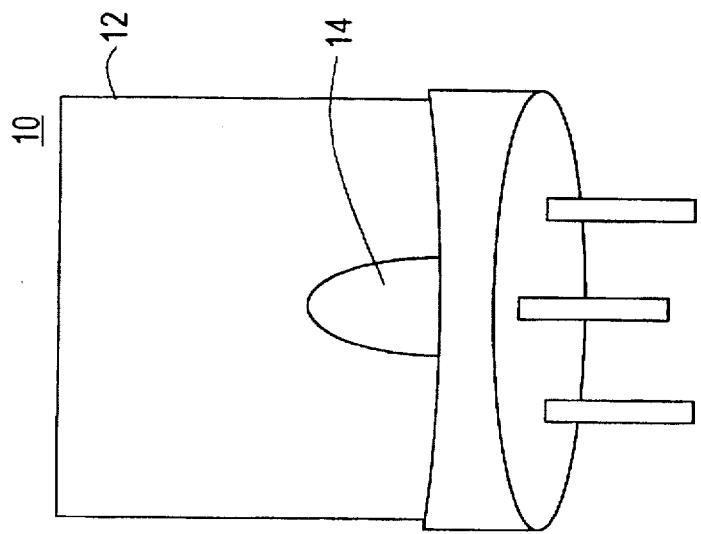
FIG. 1 is a schematic view of a photocontrol for a standard ANSI C136.10 receptacle including the photoelectric load control system of this invention.

Photocontrol device 10, FIG. 1 includes thermoplastic, high impact resistant, ultraviolet stabilized polypropylene cover 12 and clear window 14 made from UV stabilized, UV absorbing acrylic for the light sensor which resides on a circuit board within cover 12. Photocontrol device 10 is typically configured to fit an ANSI C136.10 receptacle but may be mounted in an ANSI C136.24 "Button" package or other enclosure.

Figure 2:
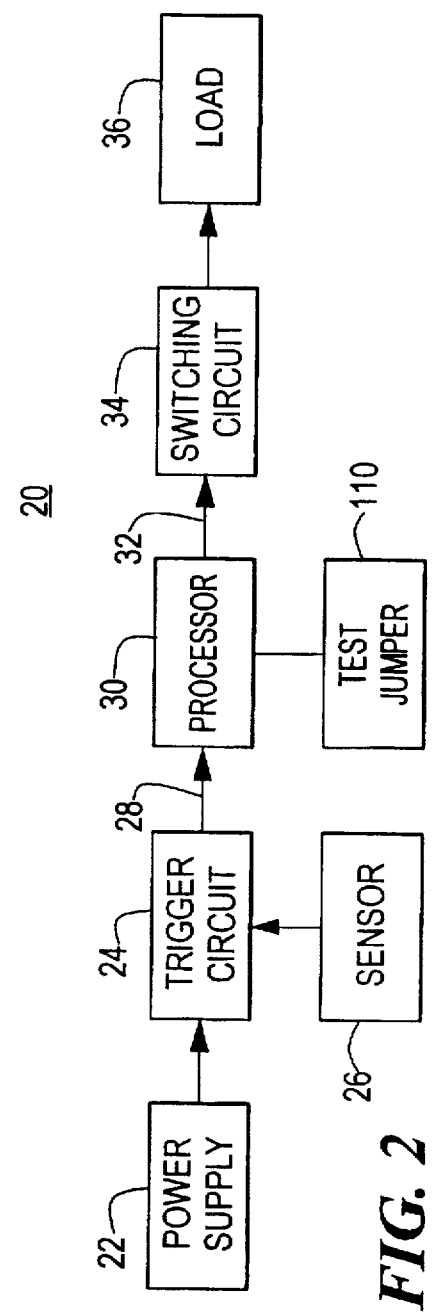
FIG. 2 is a block diagram of the primary components of the photoelectric load control system of this invention.
Figure 3:
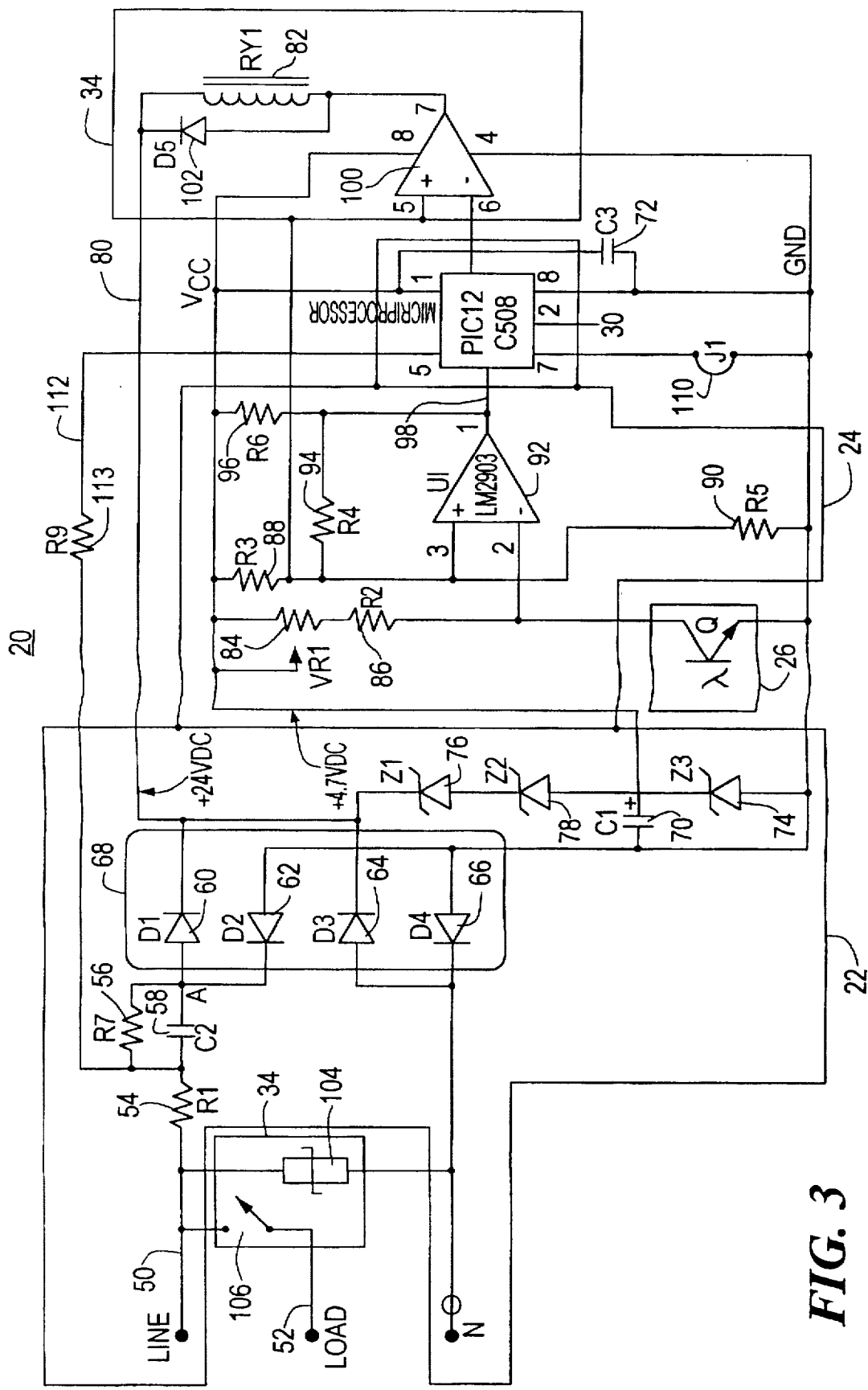
FIG. 3 is a circuit diagram for the photoelectric load control system of this invention.

The circuit board within cover 12 is configured to operate in accordance with the block diagram shown in FIG. 2 and the specific circuit diagram shown in FIG. 3.

Photoelectric load control system 20, FIG. 2, of this invention includes a power supply 22 which operates trigger circuit 24 in response to ambient light level sensor 26 such as a photocell which resides directly behind window 14, FIG. 1. Trigger circuit 24 provides an output on line 28 which is received as an input to processor 30 programmed in accordance with the programming shown in Appendix A. Processor 30 (e.g. a PIC12C508) provides an output on line 32 to switching means 34 in the form of a switching circuit. Switching circuit 34 then selectively applies power to load 36 which may be a street light in the specific embodiment discussed with reference to FIG. 1 or any other type of a load such as a water fountain on a golf course as discussed in the Background of Invention above. Test Jumper 110 provides a means of testing and calibrating the controller without operating the microprocessor timing function discussed below.

Processor 30 is programmed to be responsive, via trigger circuit 24, to a signal from sensor 26 (e.g. a sharp PT4800 Photocell) which varies between a first state and a second state in response to the ambient light level. In a typical photocell, the resistance of the photocell decreases in the presence of light. During low light levels, (e.g. at night), the voltage at light sensor 26 is high at almost 5 volts. This drives the input of trigger circuit 24 substantially high and the output of trigger circuit goes substantially low at almost 0 volts. Processor 30 monitors the signal from trigger circuit 24 and in response activates switching circuit 34 to turn the light on when it first gets dark.

When power is first supplied to photoelectric load control system 20, for example when photocontrol 10, FIG. 1 is first installed or after a power outage and then when power is resumed, processor 30 automatically times the total length of night during the first night. During the next night, processor 30 begins counting when it first gets dark and then automatically activates switching circuit 34 to turn the light off at some percentage of the total darkness period. Normally, this preset percentage is 50% so that the light is turned off at approximately midnight to save energy. In addition, processor 30 times the total length of night each night thus automatically adjusting the length of night variable to take into account the shorter summer nights and longer winter nights and then turns the light off halfway through the night without the need for complex mechanical components, or batteries or timers which are subject to failure. Finally, since processor 30 is programmed to time the total length of night when it is first installed and then each night thereafter, photoelectric load control system 20 operates correctly as shipped from the factory independent of the local destination where photocontroller 10, FIG. 1, is to be installed. Processor 30 also adds a short time delay to the switching circuit 34 so that flashes of light at night caused by headlights or lightning do not switch off load 36. The amount of time delay is programmable but is normally set at about 3 seconds.

The individual components comprising power supply 22, trigger circuit 24, sensor 26, processor 30, and switching circuit 34, FIG. 2, are shown in more detail in FIG. 3. Power supply 22 includes line 50, FIG. 3 connected to a 105 to 305 AC voltage source which is the source generally used to power a street light. Control system 20 may also be designed to work at 120 volts with change of value or omission of C2, 58.

Load line 52 is connected to a load, 36, FIG. 2, typically a street light. Resistor R1, 54 is an AC current limiting resistor with a typical value of 470 Ohms. 2.2 megohm resistor R7, 56, is a bleeder for 0.39 μF capacitor C2, 58, which prevents a shock hazard when the controller is removed from an energized receptacle. 0.39 μF capacitor C2, 58, is an AC current limiting capacitor. This capacitor has a typical value of 0.47 μF when only 120 volt operation is required. Diodes 60, 62, 64, and 66 provide a full wave rectifier bridge 68. Diodes 60 through 66 may be 1N4007. 220 μF capacitor C1, 70, is a filter capacitor for the 4.7 VDC supply output from four way rectifier bridge 68. 0.1 μF capacitor C3, 72 is also a part of power supply 22 and provides a bypass for this 4.7 VDC supply to microprocessor 30. Zener diode Z3, 74 acts as a regulator for the 4.7 VDC supplied from full wave rectifier bridge 68.

Zener diodes Z1, 76 and Z2, 78 act as a regulator for the 24 VDC supply on line 80 to relay coil 82 of switching circuit 34. Calibration potentiometer 84 of trigger circuit 24 allows calibration adjustment depending on the characteristics of specific light sensor 26. 100K resistor R2, 86 is a fixed resistor in series with potentiometer 84 to increase resolution. 100K resistor R3, 88 and 100K resistor R5, 90 make up a resistive voltage divider to supply a reference voltage to comparator 92. 100K resistor R4, 94 provides positive feed back to comparator 92 rendering its response similar to a Schmitt trigger. 100K resistor R6, 96, is a pull up resistor for the output of comparator 92. Comparator 92 (e.g. a LM2903, LM193, or LM293) converts an analog input from sensor 26 to a digital signal to be supplied over line 98 to processor 30. Relay 34 includes comparator 100 for amplifying the output signal from microprocessor 30 to drive relay coil 82. Diode D5, 102 is a freewheeling diode which passes current flow when relay coil 82 is switched off. Switching circuit 34 further includes surge protector 104 and relay contact 106. Surge protector 104 may be a varistor disposed across the AC input lines to protect against transients on the lines due to lighting and other causes. Surge protector 104 protects not only the circuits of system 20 but also the street light itself since it is across the entire line.

Jumper J1, 110 is cut prior to shipment to enable microprocessor 30 to function in its properly programmed form. With jumper 110 in place, microprocessor 30 can be operated in a test mode. Jumper J1,110 could also be a switch. Line 112 provides a clock signal through 2.2 megohm resistor R9, 113 for processor 30.

Sensor signal from light sensor 26 is an analog DC voltage from 0 to 5 volts. This voltage increases as outside light level decreases at dusk and decreases as the outside light level increases at dawn. During the day, it is almost 0 and at night it is almost 5 VDC. Trigger circuit 24 with comparator 92 compares this voltage to a preset value determined by voltage divider made up of R5, 90 and R3, 88. Typical values are 100K. The output of comparator 92 is a digital signal supplied to microprocessor 30. R4, 99 (typically 100K) adds hysteresis and makes the comparator act like a Schmitt trigger to provide rapid switching. The output of comparator 92 follows light input and has no time delay function.

The other inputs to processor 30 include an AC signal for timing through R9, 112. The typical value for R9 is 2.2 megohms although the exact value is not critical. The preferred processor 30 has internal clamping diodes. These diodes would have to be added externally if not present in microprocessor 30. The timing functions are actually counts of AC signal zero crossings.

When jumper 110 is in place (pin 7 at 0 VDC), the controller is in the test mode. Processor 30 then makes this pin go high when the jumper is cut.

The output of processor 30 is a digital signal at either 0 or approximately 5 VDC supplied to switching circuit 34. The signal is high (approximately 5 VDC) when load 36 is to be off. Processor 30 also adds a delay for the output signal during the glove test mode or during actual operation.

Comparator 100 acts like an amplifier to drive relay 34. The input is the digital signal from processor 30 and intermediate DC signal from a voltage divider made up of R5, 90 and R3, 88. The resistor values may change to accommodate different types of light sensors such as silicon or cadmium sulphide. This could also be a transistor amplifier or similar device. Depending on specific the implementation, the value of C2, 58 may change with the input of other voltages and frequencies. For some applications, C2, 58 may be omitted. In other embodiments, relay 82 may be a solid state device such as a triac or SCR.

Microprocessor 30 is programmed with an initialization and power-up routine. During this routine, all registers and variables are loaded. Initialization occurs each time power is applied or reapplied to the controller. A main program then determines if it is night or day. If it is day, the program loops and keeps checking for night. If it is night, the program turns on switching circuit 34 which actuates load 36 and starts to count the length of night. The main program also checks to make sure it is really night, or if instead there is a glove test in process by checking whether a glove test period has been exceeded. If a glove test is in progress, the program ignores the count and loops to the start of the program, looks for night and turns the load off after it is daylight.

The main program recognizes night, the load is turned on, and the counter is counting. The program is now checking for day. The program ignores any spurious light effects that last less than a programmed minimum length of day (a spurious light event period) and programmed with a turn-off time delay. If the daylight lasts longer than the turn-off time delay, switching circuit 34 is turned off which turns off load 36, the count is saved, and the registers are set. The program continues counting to make sure that a programmed minimum day length is met. If the minimum day is not met, the load is turned back on, the stored count is rejected, and the ongoing count continues. If the minimum length of day is met, then the night count is divided, for example, by two, and stored. The program then loops to check for night. The next night is the same as the first, except the lamp will be turned off halfway through the night.

The program also contains a test loop that is used during production. The test loop begins the initialization routine, then checks to see if test jumper 110 or a switch is in place. If the jumper is not in place, then the program goes to the main program. If the jumper is in place, the output of the microprocessor 30 follows the input from the trigger circuit 24. If it is dark, the load is turned on, and the program loops to check for light. If it is light, the program will turn the switching circuit 34 off which turns load 36 off, and loops to check for dark.

Microprocessor 30 also has an option to turn the load on again after having been turned off part way through the night. This option provides capabilities such as required for "AM burn". In this case the load is turned off part way through the night, when the count of night reaches a pre-set value, the program turns the load back on. After the load is turned on again, the load is turned off when it becomes light. This action of turning on the load does not affect the ongoing count of night.

That way, billboard lights will be conveniently lit during the winter months six o'clock a.m. rush hour commute until it gets light but also turned off in the extreme morning hours to save electricity.

In an alternative embodiment, the programming can be modified to time the period of daylight and subtract this value from 24 hours to determine total length of night.

For golf course fountains, subway entrance lights, tunnel entrance lights and the like, the program is effectively modified so that light means dark and dark means light. This way, these type of devices and lights will properly operate during the day but not at night.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A photoelectric load control system for applying power to a light as a function of light level and as a function of the length of each night, the system comprising:

switching means for selectively applying power to the light for turning the light on and off;

light sensitive means for providing a signal which varies between a first state and a second state in response to the light level; and processor means, responsive to said signal, for activating said switching means, said processor including:
means for activating said switching means to turn the light on in response to one of the said states,
means for timing the total length of night each night,
means for computing the period of darkness after the light is turned on,
means for determining when the computed period of darkness equals or exceeds a predetermined percentage of the timed total length of night, and
means, responsive to the means for determining, for activating said switching means to turn the light off after the computed period of darkness equals or exceeds the predetermined percentage of the total length of night.

2. The system of claim 1 in which said means for timing includes an initialization routine automatically activated whenever power is first supplied to said processor means, for resetting said processor, for timing the total length of night, and for setting the computed period of darkness equal to the timed total length of night.

3. The system of claim 1 in which said predetermined percentage is 50%.

4. The system of claim 1 in which said first state is a low ambient light level and said second state is a high ambient light level.

5. The system of claim 1 in which said first state is a high ambient light level and said second state is a low ambient light level.

6. The system of claim 1 in which said processor means further includes means for activating the switching means to turn the light on during the A.M. burn and then off again in response to a change in the light level.

7. The system of claim 1 further including a test jumper for bypassing the operation of said processor means.

8. The system of claim 1 in which said processor means further includes a glove test routine including a preset glove test period.

9. The system of claim 8 in which said processor means further includes means, responsive to the glove test routine, for bypassing the means for computing if the light is not on for a period of time greater than the glove test period.

10. The system of claim 1 in which said processor means further includes means for setting a spurious light event period.

11. The system of claim 10 in which said processor means further includes means, responsive to said means for setting a spurious light event period, for bypassing the means for activating the switch means to turn the light off.

12. A method of operating a photoelectric load system for applying power to a light as a function of light level and as a function of the length of each night, the method comprising:

selectively applying power to the light for turning the light on and off;

sensing the light level and providing a signal which varies between a first state and a second state in response to the light level; and programming a processor means to be responsive to said signal and to function as follows:
turning the light on in response to one of said states,
timing the total length of night each night,
computing the period of darkness after the light is turned on, determining when the computed period of darkness exceeds a predetermined percentage of the total length of night, and in response, turning the light off.

13. The method of claim 12 in which timing includes automatically activating an initialization routine whenever power is first supplied or resupplied to said processor means, for resetting said processor, for timing the total length of night, and for setting the computed period of darkness equal to the timed total length of night.

14. The method of claim 12 in which said predetermined percentage is 50%.

15. The method of claim 12 in which said first state is a low ambient light level and said second state is a high ambient light level.

16. The method of claim of 12 in which said first state is a high ambient light level and said second state is a low ambient light level.

17. The method of claim 12 in which programming further includes turning the light on during the A.M. burn and off again in response to a change in the ambient light level.

18. The method of claim 12 further including installing a test jumper or switch for bypassing the programming of said processor means.

19. The method of claim 12 in which programming said processor means further includes setting a glove test period.

20. The method of claim 15 further including bypassing the step of computing if it is not dark for a period of time greater than the glove test period.

21. The method of claim 12 in which programming said processor means further includes programming a spurious light event period.

22. The method of claim 21 further including bypassing the step of turning the light off if the spurious light event period is not exceeded.

23. A processor for a photoelectric load system for applying power to a light or load as a function of light level and as a function of the length of darkness or daylight, the processor comprising:

means for timing the total length of time of a particular light level;

means for computing the period of time of a particular light level after the light is turned on; and means for determining when the computed period of time of a particular light level exceeds a predetermined percentage total length of time of the particular light level.

24. A photoelectric load control system for applying power to a load as a function of light level and as a function of the period of time of a particular light level, the system comprising:

switching means for selectively applying power to the load for turning the load on and off;

light sensitive means for providing a signal which varies between a first state and a second state in response to the light level; and processor means, responsive to said signal, for activating said switching means, said processor including:

means for activating said switching means to turn the light on in response to one of said states, means for timing the total period of a particular light level, means for computing the period of time of a particular light level after the light is turned on, means for determining when the computed period of time of a particular light level equals or exceeds a predetermined percentage of the total period of a particular light level, and means, responsive to the means for determining, for activating said switching means in response to the computed period of time of a particular light level equalling or exceeding the predetermined percentage of the total period of a particular light level.

25. A photoelectric load control system for applying power to a light as a function of the light level and as a function of the duration of a particular light level, the system comprising:

switching means for selectively applying power to the light for turning the light on and off;

light sensitive means for providing a signal which varies between a first state in response to a light level above a predetermined threshold and a second state in response to a light level below the predetermined threshold;

processor means, responsive to said signal, for activating said switching means, said processor including:

means for activating said switching means to turn the light on in response to said second state of the signal, means for timing the duration of the second state of the signal, and means for activating said switching means to turn the light off after the timed duration equals or exceeds a predetermined threshold duration.

* * * * *